United States Patent [19]

Whiteley

[11] 4,197,613
[45] Apr. 15, 1980

[54] MEAT TENDERIZING DEVICE AND METHOD

[76] Inventor: Isaac C. Whiteley, P.O. Box 294, Redmond, Oreg. 97756

[21] Appl. No.: 903,024

[22] Filed: May 4, 1978

[51] Int. Cl.² .............................................. A22C 9/00
[52] U.S. Cl. ........................................... 17/52; 17/25
[58] Field of Search ....................... 17/25, 30, 31, 52; 99/532, 533, 494

[56] References Cited

U.S. PATENT DOCUMENTS

| | | | |
|---|---|---|---|
| 1,467,949 | 9/1923 | Pershing | 17/30 |
| 1,550,777 | 8/1925 | Bloomfield | 17/30 |
| 2,001,641 | 5/1935 | West | 17/26 |
| 2,008,326 | 7/1935 | Harvey | 17/26 |
| 2,984,170 | 5/1961 | Draudt et al. | 99/533 |

*Primary Examiner*—Willie G. Abercrombie
*Attorney, Agent, or Firm*—Robert H. Epstein

[57] ABSTRACT

A meat tenderizing device includes sharp tipped blades mounted in a support body and a spreader assembly for spreading the blades apart such that the device can be utilized to tenderize meat by forcing the sharp tipped blades into the meat to cut connective tissue of the meat during insertion and spreading the blades apart while the blades remain in the meat to tear the connective tissue of the meat.

15 Claims, 8 Drawing Figures

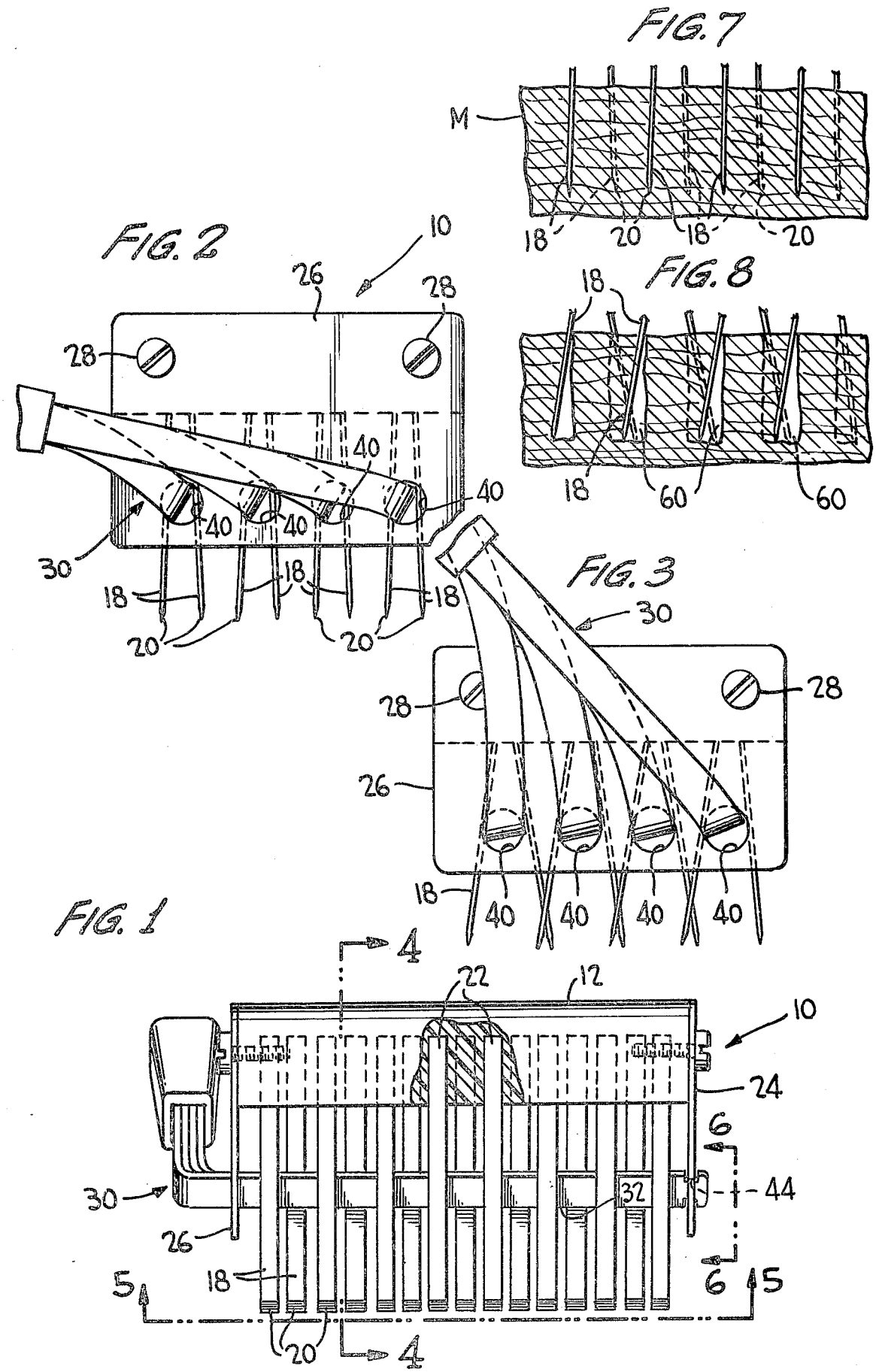

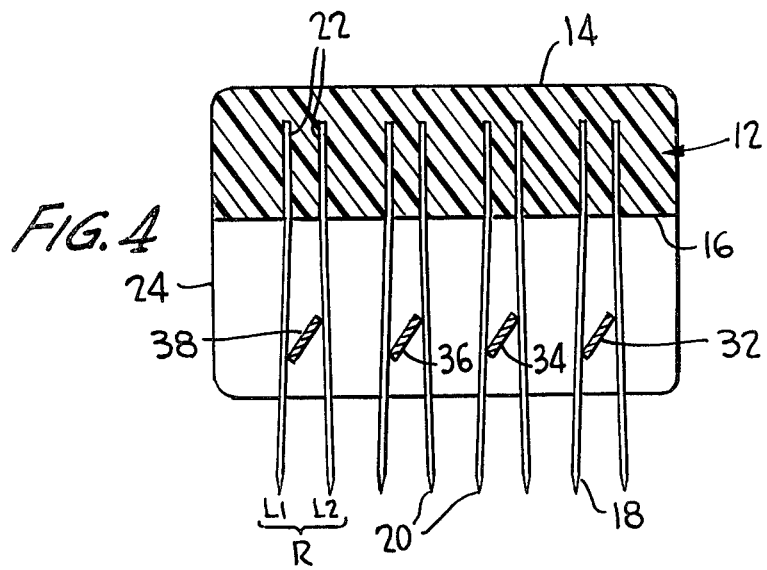
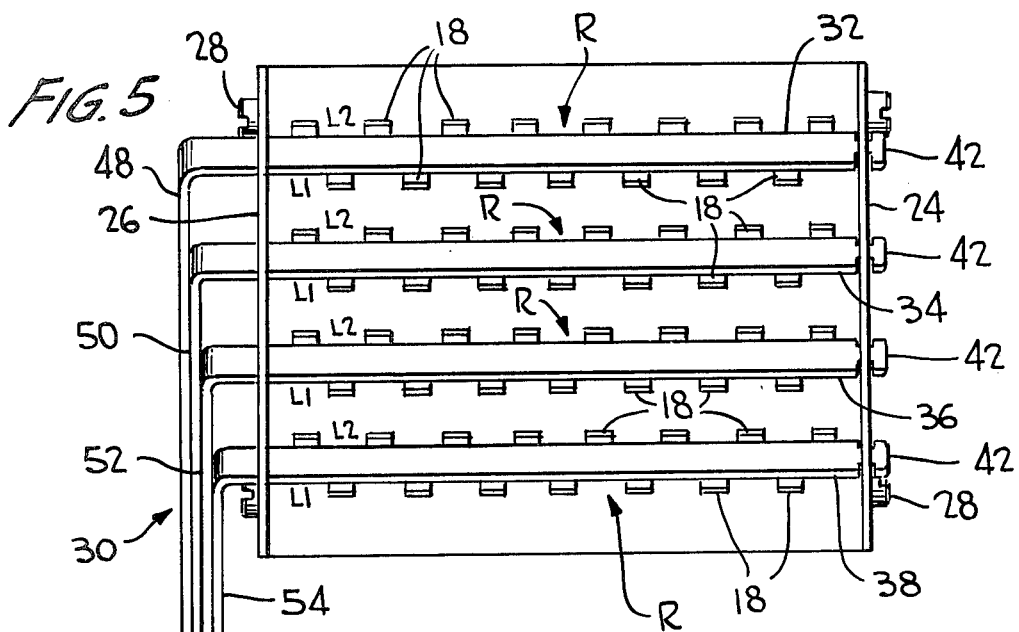
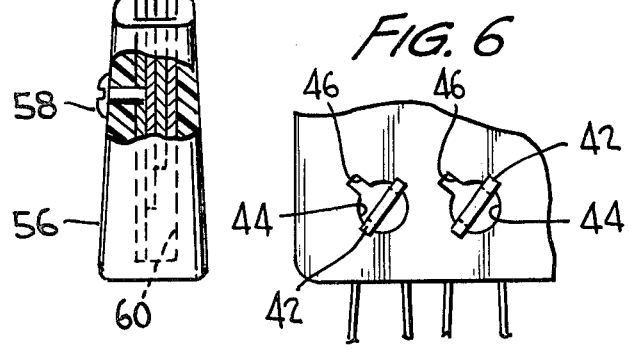

MEAT TENDERIZING DEVICE AND METHOD

BACKGROUND OF THE INVENTION

1. Field of the Invention

The present invention pertains to the treating of meat to improve tenderness and, more particularly, to a meat tenderizing device and method wherein connective tissue of the meat is cut and torn apart.

2. Discussion of the Prior Art

When an animal is slaughtered to produce comestible meat, there are many cuts of meat which are too tough for ordinary consumption without requiring some sort of treatment to tenderize the meat. The toughness of meat, particularly beef, is caused by connective tissue, such as tendons, holding the meat together and rendering the meat difficult to chew. In order to tenderize such cuts of meat to render them more suitable for human consumption, it has been conventional in the past to either treat the meat with a tenderizing agent, which has the disadvantage of altering the taste of the meat, or to utilize meat tenderizing devices whose purpose is to cut or tear the connective tissue of the meat, as exemplified by U.S. Pat. Nos. 1,550,777 to Bloomfield, 2,001,641 to West and 2,008,326 to Harvey. Such meat tenderizing devices, while recognizing the need to destroy the connective tissue of the meat to render it tender, have had the disadvantages of bruising and changing the texture of the meat, and of requiring much physical effort and time while not tenderizing the meat to the extent desired; and, thus, such devices are not employed by many who would like to be able to serve normally tough, less expensive cuts of meat.

SUMMARY OF THE INVENTION

Accordingly, it is a primary object of the present invention to overcome the disadvantages of the prior art by providing a meat tenderizing device and method which permits the tenderizing of tough cuts of meat in a simple and efficient manner.

Another object of the present invention is to tenderize meat by initially cutting connective tissues of the meat during insertion of sharp tipped blades and, thereafter, tearing or separating the connective tissues while the blades remain in the meat by spreading the blades from each other.

The present invention has an additional object in that a meat tenderizing device includes a spreading assembly for moving first and second sharp tipped blades from a first position in which the blades are inserted into a piece of meat to cut connective tissue to a second spaced position to tear the connective tissue of the meat.

A further object of the present invention is to provide a method of tenderizing meat wherein sharp tipped blades are forced into a piece of meat to cut connective tissue of the meat during insertion and the sharp tipped blades are thereafter spread apart while the blades remain in the meat to tear connective tissues of the meat.

Yet another object of the present invention is to construct a meat tenderizing device which can be manipulated easily to efficiently and quickly tenderize meat.

Some of the advantages of the present invention over the prior art are that the meat tenderizing device of the present invention is simple in construction and operation, is economical to manufacture and can be easily handled by an individual to tenderize meat while leaving the outside of the meat relatively intact such that the meat retains its juices and natural appearance during cooking.

The present invention is generally characterized in a meat tenderizing device including first and second blades, a support mounting the first and second blades in a first position relative to each other, and a spreader assembly for moving the first and second blades from the first position to a second position spaced further apart than in the first position whereby the first and second blades can be forced into a piece of meat in the first position to cut connective tissue of the meat during insertion and then can be spread within the meat by movement to the second position to tear connective tissue of the meat.

The present invention is further generally characterized in a method of tenderizing meat includng the steps of forcing sharp tipped blades into a piece of meat to cut connective tissue of the meat during insertion, and spreading the blades apart while the blades remain in the meat to tear connective tissue of the meat.

Other objects and advantages of the present invention will become apparent from the following discussion of the preferred embodiment taken in conjunction with the accompanying drawings.

BRIEF DESCRIPTION OF THE DRAWINGS

FIG. 1 is a side elevation partly in section of a meat tenderizng device according to the present invention.

FIGS. 2 and 3 are end elevations showing the meat tenderizing device of the present invention in cutting and tearing positions, respectively.

FIG. 4 is a section taken along lines 4—4 of FIG. 1.

FIG. 5 is a view taken along lines 5—5 of FIG. 1.

FIG. 6 is a broken view taken along line 6—6 of FIG. 1.

FIGS. 7 and 8 depict the insertion of the blades of the meat tenderizing device of FIG. 1 into meat and the spreading movement of the blades within the meat, respectively.

DESCRIPTION OF THE PREFERRED EMBODIMENT

A meat tenderizing device 10 according to the present invention is illustrated in FIG. 1 and includes a plastic support body 12 having an upper surface 14 with rounded edges of a configuration to be easily gripped in one hand of a user. The body 12 has a bottom surface 16 in which sharp tipped blades 18 are mounted. As best illustrated in FIG. 5, the blades 18 are arranged in four parallel rows R with each row formed of two spaced lines L1 and L2 of blades 18 in staggered relation. The blades 18 are made of a spring metal and have sharp cutting tips 20 and shanks 22 embedded in the body 12, as shown in FIG. 4.

Flanges 24 and 26 extend from opposite ends of the body 12 and are secured thereto in any suitable manner, such as by means of pairs of screws 28 on each end. A spreader assembly 30 is mounted on the flanges 24 and 26 and includes flat bars 32, 34, 36 and 38 each passing through an opening 40 in flange 26 and each having a T-shaped end 42 received in an opening 44 in flange 24. As best shown in FIG. 6, openings 44 each have a radial slot 46 extending therefrom to permit insertion of the T-shaped ends 42 therein, the T-shaped ends being held in place by the heads of the Ts having a greater width than the diameter of the openings 44 such that the areas of the flange 24 adjacent the openings 44 are captured in the notches in the T-shaped end. The bars 32, 34, 36 and 38 each pass between the lines of blades L1 and L2 of each row R, and the bars are relatively flat and have a width such that the blades 18 spring bias the bars counter-clockwise, looking at FIGS. 3 and 4. After passing through the holes 40 in flange 26, the bars 32, 34, 36 and 38 are bent to extend along the flange defining arms 48, 50, 52 and 54, respectively, arm 48 being secured to a handle 56 by means of a screw 58. The handle 56 has a recess 60 therein receiving and capturing the ends of the arms 48, 50, 52 and 54 while permitting slight movement of the arms 50, 52 and 54 relative to arm 48 and to each other.

In use, a piece of meat to be tenderized is placed on a flat support, and a downward force is applied to the body 12 to force the blades 18 into the meat cutting connective tissue during insertion. After the blades are fully inserted into the meat, the spreader assembly is actuated by pulling up on handle 56 while pressing down on body 12 such that the bars of the spreader assembly rotatably move to engage the blades 18 in each line L1 and L2 of each row R to cause the blades in each row to be spread apart to tear the connective tissue in the meat. The blades 18 are made of a spring metal such that the blades bend when the spreader assembly is actuated; and, once the handle is released, the spring bias of the blades will return the spreader assembly to its original state with the blades in the same position as during insertion in the meat such that the blades can be withdrawn from the meat. In this manner, connective tissue of the meat is not only cut during insertion of the blades into the meat but is torn apart and separated when the blades are spread such that the meat is tenderized to a great extent without cutting the meat into small pieces or in anyway changing the outward appearance of the meat. The procedure may be repeated as many times as desired along one side of the piece of meat, and the piece of meat can then be turned over to permit tenderizing treatment in the same manner from the opposite side, if desired, dependent upon the toughness of the meat and the tenderness required.

The meat tenderizing device 10 is shown in FIG. 2 in its normal state with the blades 18 in a first or cutting position. When the blades are forced into a piece of meat M, as illustrated in FIG. 7, the sharp tips 20 cut the connective tissue of the meat along their path of travel into the meat. The blades can have any desired length for use with specific cuts of meat; however, a length of from $\frac{1}{8}$ to $\frac{3}{4}$ inch from the edges of flanges 24 and 26 to the tips 20 has been found to be effective for tenderizing most cuts of meat. As shown in FIG. 2, the tips 20 of the blades are positioned within the meat upon full insertion so as to assure that a full tearing effect is created when the spreader assembly is actuated.

When the spreader assembly 30 is actuated, as shown in FIG. 3, the blades 18 in each line of each row are moved to a second or tearng position spaced further apart than in the first position, and the movement of the blades tears apart and separates the connective tissue of the piece of meat M, as shown at 62 in FIG. 8. Actuation of the spreader assembly to move the blades 18 to the second position is accomplished by pulling up on handle 56 to rotate the bars 32, 34, 36 and 38 against the spring bias of the blades 18; and, when the handle is released, the spring bias of the blades will return the meat tenderizing device 10 to the state shown in FIG. 2 such that the blades can be withdrawn from the meat. Once the blades are withdrawn, the small punctures from insertion of the blades will close such that the outward appearance of the meat is unchanged even though the interior connective tissue of the meat has been destroyed to a great extent, and the meat will thus retain an appetizing natural appearance while sealing in juices during cooking.

The use of parallel rows of sharp tipped blades as shown in FIG. 5 has the advantage of permitting a simple spreader assembly to be used to spread the blades and assuring maximum cutting and tearing of the connective tissue of the meat while leaving the meat intact as a single cut or piece. To this end, the staggered relation of blades in the lines of each row provides maximum cutting and tearing action. It has been found that advantageous results are obtained using flat blades having a $\frac{1}{8}$ inch width at their tips 20 with the blades in each line spaced at approximately $\frac{1}{2}$ inch intervals, the spacing between lines in the first position being approximately 7/16 inch and the spacing between rows being approximately $\frac{1}{8}$ inch. When the blades are spread to the second position, they are spaced by approximately 11/16 inch to produce a $\frac{1}{4}$ inch spreading movement accommodated by the staggered relation of the blades in adjacent lines.

While the embodiment of the meat tenderizing device 10 as described above has been found to be very effective in tenderizing meat, it will be appreciated that the concept of the present invention of inserting blades in meat to cut connective tissues and then spreading the blades to tear apart and separate the connective tissue could be implemented with blades and spreader assemblies of various configurations.

Inasmuch as the present invention is subject to many variations, modifications and changes in detail, it is intended that all subject matter discussed above or shown in the accompanying drawings be interpreted as illustrative and not in a limiting sense.

I claim:

1. A meat tenderizing device comprising
first blade means including a plurality of first sharp tipped blades;
second blade means including a plurality of second sharp tipped blades;
support means mounting said first and second blade means in a first position relative to each other; and
spreading means movable between said first and second blade means to move said first and second blade means from said first position to a second position spaced further apart than in said first position whereby said first and second blade means can be forced into a piece of meat in said first position to cut connective tissue of the meat during insertion and then can be spread within the meat by movement to said second position to tear connective tissue of the meat.

2. A meat tenderizing device as recited in claim 1 wherein said plurality of first blades are aligned in a first line, said plurality of second blades are aligned in a second line spaced from said first line, and said spreader means spaces said second blades in said second line away from said first blades in said first line.

3. A meat tenderizing device as recited in claim 2 wherein said spreader means includes a bar disposed between said first and second lines and movable to engage said second blades and spread said second blades to said second position.

4. A meat tenderizing device as recited in claim 1 wherein said first blade means and said second blade means are arranged in a plurality of rows, each row including a first line formed of a plurality of said first blades and a second line formed of a plurality of said second blades, and said spreader means includes a plurality of bars each disposed between said first line and said second line in one of said rows and movable to engage said second blades and spread said second blades to said second position.

5. A meat tenderizing device as recited in claim 4 wherein said spreader means includes handle means for moving said plurality of bars simultaneously.

6. A meat tenderizing device as recited in claim 5 wherein said support means includes a body and said first and second blades have shanks mounted in said body.

7. A meat tenderizing device as recited in claim 6 wherein said first and second blades in said first and second lines of each of said rows are disposed in staggered relation.

8. A meat tenderizing device as recited in claim 1 wherein said plurality of first blades are aligned in a line and said plurality of second blades are aligned in a line adjacent said line of said first blades and in staggered relation therewith.

9. A method of tenderizing meat comprising the steps of
forcing a plurality of sharp tipped blades into a piece of meat to cut connective tissue of the meat during insertion; and
spreading the blades apart while the blades remain in the meat to tear connective tissue of the meat.

10. A method of tenderizing meat as recited in claim 9 and further comprising the steps of, after said spreading step, returning the blades to the position thereof during insertion in the meat, and withdrawing the blades from the meat.

11. A meat tenderizing device comprising
support means;
a pluralitly of sharp tipped blades made of a spring material having shanks mounted in the support means; and
spreading means engaging said blades and movable between said blades to bend said blades whereby said blades can be forced into meat to cut connective tissue of the meat during insertion and said blades can be spread apart while in the meat by movement of said spreading means to tear connective tissue of the meat.

12. A meat tenderizing device as recited in claim 11 wherein said blades are arranged in a plurality of rows each formed of two lines of said blades and said spreading means includes a plurality of bars each disposed between said two lines of each of said rows and movable to force said blades in one of said lines away from said blades in the other of said lines, said spring material of said blades biasing said bars in a direction opposite to the direction of movement of said bars to spread said blades apart.

13. A meat tenderizing device as recited in claim 12 wherein said support means includes a body mounting said blades and forming a grip for said meat tenderer and a pair of flanges extending from opposite ends of said body, and said bars of said spreader means are mounted on said flanges.

14. A meat tenderizing device as recited in claim 13 wherein said bars of said spreader means are relatively flat and are rotatably mounted on said flanges.

15. A meat tenderizing device as recited in claim 14 wherein said bars of said spreader means each have an extension arm extending along one of said flanges, and said spreader means includes means connected with one of said extension arms having a configuration such that movement of said one extension arm moves the other extension arms to rotate said bars.

* * * * *